United States Patent [19]

Taniguchi et al.

[11] Patent Number: 5,340,514

[45] Date of Patent: Aug. 23, 1994

[54] METHOD FOR PREPARING POTTERY PRODUCTS CONTAINING SHIRASU BALLOONS

[75] Inventors: Ryoziro Taniguchi, Aichi; Takao Yamaguchi; Osamu Saito, both of Kanagawa, all of Japan

[73] Assignees: Setoseido Kabushiki Kaisha, Aichi; Iwaki Glass Co., Ltd.; Tokai Kogyo Kabushiki Kaisha, both of Tokyo, all of Japan

[21] Appl. No.: 952,993

[22] Filed: Sep. 29, 1992

[30] Foreign Application Priority Data

Sep. 30, 1991 [JP] Japan .................................. 3-278868
Aug. 25, 1992 [JP] Japan .................................. 4-248684

[51] Int. Cl.$^5$ ............................................. C04B 38/08
[52] U.S. Cl. ........................................ 264/62; 264/63; 501/85
[58] Field of Search ................... 264/62, 63; 501/85

[56] References Cited

U.S. PATENT DOCUMENTS

| | | | |
|---|---|---|---|
| 3,893,928 | 7/1975 | Ono et al. | 264/29.7 |
| 4,016,229 | 4/1977 | Tobin | 264/63 |
| 5,017,523 | 5/1991 | Kimura et al. | 501/85 |
| 5,038,089 | 7/1977 | Kawai | 501/38 |

FOREIGN PATENT DOCUMENTS

| | | |
|---|---|---|
| 55-116651 | 9/1980 | Japan . |
| 62-98592 | 5/1987 | Japan . |
| 63-203555 | 8/1988 | Japan . |

*Primary Examiner*—James Derrington
*Attorney, Agent, or Firm*—Wenderoth, Lind & Ponack

[57] ABSTRACT

The present invention relates to a process of using shirasu balloon powder as a material to manufacture pottery products where;

white pottery products of light weight, highly white coloring, uniformly distributed density and satisfactory strength can be obtained by removing impurities such as iron from the shirasu balloon powder and diffusing the shirasu balloon powder uniformly in the body and reinforcement agent, or non-white pottery products of light weight, uniformly distributed density and satisfactory strength can be obtained by diffusing the shirasu balloon powder uniformly in the body and reinforcement agent without removing impurities such as iron from the shirasu balloon powder.

2 Claims, 2 Drawing Sheets

METHOD FOR PREPARING POTTERY PRODUCTS CONTAINING SHIRASU BALLOONS

BACKGROUND OF THE INVENTION

The present invention relates to pottery materials which comprise fine foamed particles called shirasu balloons made through firing and expansion of white or graysh white volcanic ejects and the method of manufacturing the pottery products, together with constitution of the products.

The term shirasu which denotes a kind of volcanic ejecta which makes fine foamed particles in a process described later is well known in Japan and is used as an established technical term together with shirasu balloon.

It is also known that the chemical composition and the component proportions of shirasu are as shown below, while depending on the district in which it is unearthed. $SiO_2$ (65–73), $Al_2O_3$ (12–16), $Fe_2O_3$ (1–3), $CaO$ (2–4), $Na_2O$ (3–4), $K_2O$ (2–4), $TiO_2$ (0.2–0.7), $MgO$ (0.4–1).

As can be seen from the chemical composition and component proportions, shirasu has such advantages as light-weight, excellent fire resistance and heat insulation, low water absorption and low cost, and is therefore looked at as a useful new material for various industrial applications.

For these advantages, shirasu has recently been put into industrial applications as a promising new material, and a product made by firing ground shirasu, then heating it so that the particles expand and foam, is marketed as shirasu balloon.

Shirasu balloon has been employed in many industrial applications such as construction materials including concrete aggregate for weight reduction, top coating mortar, top coating plaster and sprayed coating material, and agricultural purposes including seedbed material and soil modifier.

Laid open Japanese patent gazette No. S55-116651, No. S62-98592 and No. S63-203555 show that shirasu balloon has been applied to make tiles, microwave oven trays and tableware to reduce the weight of these products.

The present inventors tried to make light-weight pottery products taking advantage of the properties of shirasu balloon.

However, shirasu includes impurities such as iron and titanium as it is a natural material, and therefore has drawbacks such as staining on the product surface and difficulty in obtaining clear white color because of oxidation of the iron contents during firing after being glazed, in spite of its advantage of being capable of reducing the weight of pottery products, due to its physical properties.

Thus it is indispensable to remove impurities to make white pottery products, although said process is not required in the manufacture of non-white pottery products.

Furthermore, the difference in the bulk density between shirasu balloon, the body and other materials used to manufacture pottery products makes it difficult to uniformly mix shirasu balloon with the body and other materials to make pottery.

The inventors also found through an experiment that the use of shirasu balloon decreased the strength of pottery products.

The primary objective of the invention is to remove impurities such as iron and titanium from shirasu balloon to make it applicable to the manufacture of pottery products.

The second objective of the invention is to provide a means of making shirasu balloon diffuse uniformly among the body and other materials.

The third objective of the invention is to provide a means of increasing the strength of pottery products which include shirasu balloon without compromising the advantages of using shirasu balloon.

The merits set forth above and other merits of the invention will become evident through the detailed description of the invention that follow, with reference to the drawings.

Identical numbers used in different figures denote similar objects.

SUMMARY OF THE INVENTION

The present invention provides:

A material to manufacture white pottery prepared by mixing selected shirasu balloon which is obtained by removing all or a significant part of impurities such as iron and titanium from shirasu balloon into a mixture of body and reinforcement material of one or more kinds selected from among alumina, zircon, cristobalite, magnesia and talc, to make the selected shirasu balloon uniformly diffused, a means of manufacturing white pottery from the said material prepared in the process set forth above, a method of preparing a material to manufacture white pottery by using shirasu balloon, where fine powder of shirasu balloons is obtained by sieving, which is then processed with a magnet filter to remove all or a significant part of impurities such as iron and titanium from the shirasu balloon powder and obtain selected shirasu balloon powder which is put into water and stirred and thereafter mixed with the body and reinforcement agent of one or more kinds selected from among alumina, zircon, cristobalite, magnesia and talc containing magnesium and stirred again, and the mixture thereby generated is dewatered, a method of preparing a material for the manufacturer of white pottery by using shirasu balloon, where selected shirasu balloon powder, obtained by removing all or a significant part of impurities such as iron and titanium from shirasu balloon, is mixed with body and reinforcement material of one or more kinds selected from among alumina, zircon, cristobalite, magnesia and talc, with water added thereto in a prescribed proportion, and kneading the mixture to have the selected shirasu balloons diffused in the mixture uniformly, a method of preparing a material for the manufacture of white pottery by using shirasu balloon, where selected shirasu balloon powder, obtained by removing all or a significant part of impurities such as iron and titanium from shirasu balloon, is mixed with the body and reinforcement material of one or more kinds selected from among alumina, zircon, cristobalite, magnesia and talc, and a relatively small quantity of water and a hydrophilic lubricant such as glycerin are added to the mixture prepared in the above process, and the mixture is kneaded, a method of manufacturing white pottery comprising processes as molding, drying, glazing and firing from a material prepared in the method set forth above, a method of preparing a material for the manufacture of non-white pottery comprising uniformly diffusing shirasu balloon powder into the body and reinforcement agent of one or more kinds selected from among alumina, zircon, cristobalite, magnesia and talc, a means of manufacturing non-white pottery from the material prepared in the process set forth above, a method of preparing a material for the manufacture of non-white pottery by using shirasu balloon, where shirasu balloon powder is put into water and stirred and thereafter mixed with the body and reinforcement material of one or more kinds selected from among alumina, zircon, cristobalite, magnesia and talc and stirred again, and the mixture obtained thereby is dewatered, a method of preparing a material for the manufacture of non-white pottery by using shirasu balloon, where water is added in a prescribed proportion to a mixture of shirasu balloon powder, the body and reinforcement material of one or more kinds selected from among alumina, zircon, cristobalite, magnesia and talc, and the mixture obtained thereby is kneaded to have the shirasu balloon powder diffused in the mixture uniformly, a method of preparing a material for the manufacture of non-white pottery by using shirasu balloon, where a relatively small quantity of water and a hydrophilic grease such as glycerin are added to a mixture of shirasu balloon powder the body and reinforcement material of one or more kinds selected from among alumina, zircon, cristobalite, magnesia and talc, and the mixture obtained thereby is kneaded.

A method of manufacturing non-white pottery through such processes as molding, drying, glazing and firing from a material prepared in the method set forth above.

DETAILED DESCRIPTION OF THE PREFERRED EMBODIMENTS

First embodiment

Figure 1:
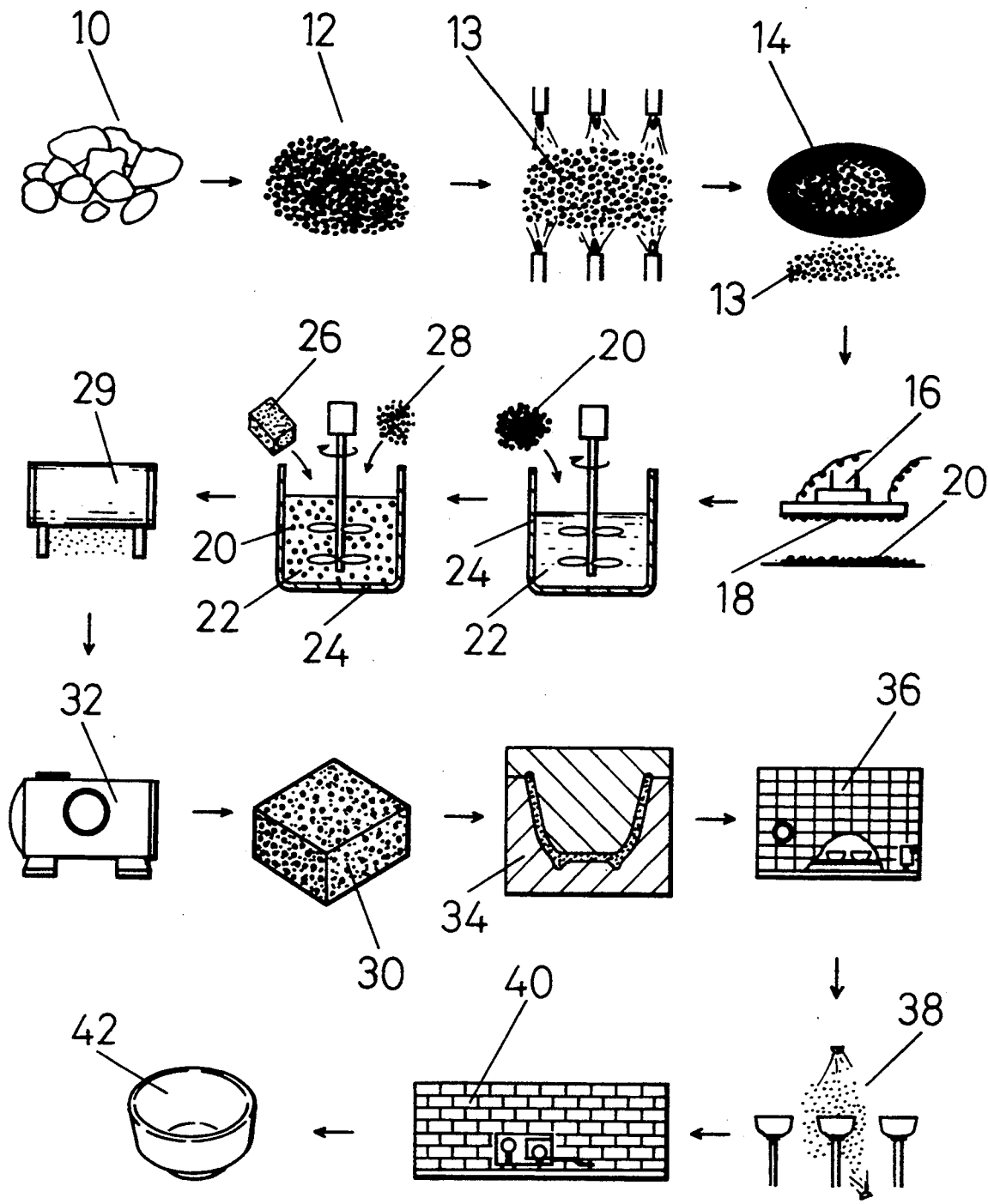
FIG. 1 shows a schematic process of an embodiment of the invention.

Prior to the detailed description of embodiments of the invention, basic processes of manufacturing pottery products from materials including shirasu balloon will be briefly described in the following.

This embodiment is a process of obtaining a material to manufacture white pottery and the composition thereof.

NO. 1

(1) Shirasu rock is ground to obtain shirasu powder.
(2) Shirasu powder is sieved to regulate the particle size.
(3) Shirasu powder of regulated particle size is heated to expand in order to obtain shirasu balloons.
(4) The shirasu balloon powder obtained by heat-expansion is processed to remove particles which are out of the tolerance.
(5) Regulated shirasu balloon powder with the particles of acceptable tolerance is processed to remove impurities such as iron and titanium and thereby obtain selected shirasu balloon powder.
(6) Selected shirasu balloon powder is mixed with water.
(7) The mixture of the selected shirasu balloon powder and water is mixed with the body and reinforcement agent.
(8) The mixture obtained in step (7) is well kneaded to make it uniformly mixed, then dewatered to obtain a material for the manufacture of white pottery.
(9) The material obtained in step (8) is subjected to processes of molding, drying, glazing and firing to obtain pottery products.

No. 2

(1) Shirasu rock is ground to obtain shirasu powder.
(2) Shirasu powder is sieved to regulate the particle size.
(3) Shirasu powder is processed to remove impurities such as iron and titanium.
(4) Shirasu powder with the impurities removed is heated to expand to obtain shirasu balloon powder.
(5) The shirasu balloon powder obtained in step (4) is processed to remove particles which are out of the tolerance and thereby obtain selected shirasu balloon powder.
(6) Selected shirasu balloon powder is mixed with water.
(7) The mixture of selected shirasu balloon powder and water is mixed with the body and reinforcement agent.
(8) The mixture obtained in step (7) is well kneaded to make it uniformly mixed, then dewatered to obtain a material for the manufacture of white pottery.
(9) The material obtained in step (8) is subjected to processes of molding, drying, glazing and firing to obtain pottery products.

NO. 3

(1) Shirasu rock is ground to obtain shirasu powder.
(2) Shirasu powder is sieved to regulate the particle size.
(3) Shirasu powder of regulated particle size is heated to expand in order to obtain shirasu balloon powder.
(4) The shirasu balloon powder is processed to remove impurities such as iron and titanium.
(5) The shirasu balloon powder with the impurities removed is processed to remove particles which are out of the tolerance, and thereby obtain selected shirasu balloon powder.
(6) The selected shirasu balloon powder is mixed with water.
(7) The mixture of selected shirasu balloon powder and water is mixed with the body and reinforcement agent.
(8) The mixture obtained in step (7) is kneaded, then dewatered to obtain a material for the manufacture of white pottery.
(9) The material obtained in step (8) is subjected to processes of molding, drying, glazing and firing to obtain pottery products.

No. 4, although this is not so generally employed.
(1) Shirasu rock is ground to obtain shirasu powder.
(2) Shirasu powder is processed to remove impurities such as iron and titanium.
(3) Shirasu powder is sieved to regulate the particle size.
(4) Shirasu powder of regulated particle size is heated to expand thereby to obtain shirasu balloon powder.
(5) The shirasu balloon powder with the impurities removed is processed to remove particles beyond the tolerance, and thereby obtain selected shirasu balloon powder.
(6) The selected shirasu balloon powder is mixed with water.

(7) The mixture of the selected shirasu balloon powder and water is mixed with the body and reinforcement agent.

(8) The mixture obtained in step (7) is stirred and kneaded uniformly, then dewatered to obtain a material for the manufacture of white pottery.

(9) The material obtained in step (8) is subjected to processes of molding, drying, glazing and firing to obtain pottery products.

Among the four procedures set forth above, No. 1 through No. 3 are the same in step 1, step 2 and the steps that follow No. 6 inclusive, while different in steps 3 through 5, the order thereof being changed. No. 4 is the same as other procedures in step 1 and the steps that follow step 6 inclusive, while steps 2 through 5 are different from other procedures.

However, there is no essential difference among the four procedures as to the objective of obtaining selected shirasu balloon powder.

Therefore the explanation that follows deals with procedure No. 1 with reference to the drawings.

Figure 2:
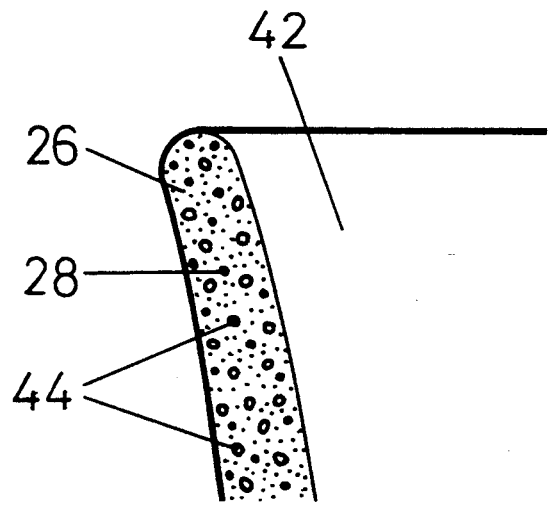
FIG. 2 shows a partially enlarged cross section of a pottery product.
Figure 3:
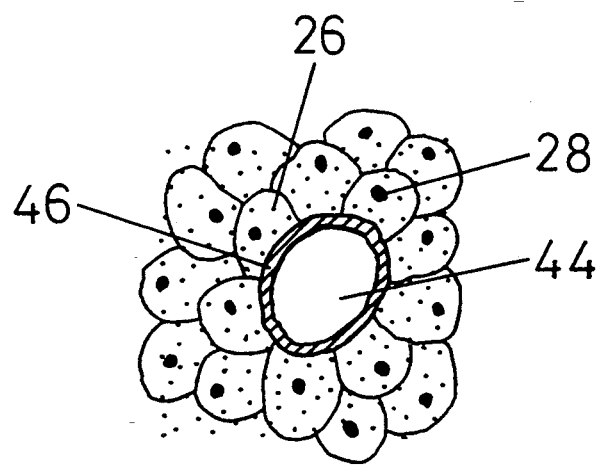
FIG. 3 shows the microscopic structure inside the product.

FIG. 1 shows a schematic process of an embodiment of the invention. FIG. 2 shows a partially enlarged cross section of a pottery product (a rice bowl). FIG. 3 shows the microscopic structure inside the product.

First shirasu rock 10 as mined is ground into shirasu powder 12, which is sieved to obtain regulated particle sizes, preferably from 14 to 90 micrometers for the convenience of the processes that follow.

The shirasu powder 12 of regulated particle size obtained in the above process is fired to expand into balloons, preferably at the softening temperature of shirasu, from 900° to 1000° C.

The shirasu balloon powder 13 at this stage includes impurities such as iron and therefore cannot be used in this embodiment, although it may be used as it is as a construction material.

Shirasu balloon powder 13, as generated by expansion of the shirasu powder 12, has particle sizes about twice that of the shirasu powder, most of them from 25 to 180 micrometers.

Some large particles out of the tolerance, which is from 25 to 180 micrometers, are also generated by the bonding of multiple balloons.

These particles of sizes out of the tolerance must be removed.

A vibrating screen 14 equipped with a screen of 80 to 120 mesh is employed in the classification process where shirasu balloon powder 13 suspended in water is pumped up and particles of sizes from 25 to 180 mirometers are obtained.

Although particle sizes from 25 to 180 micrometers are found to be preferable as the shirasu balloon powder 13 from experiments, use of particles smaller than 25 micrometers or larger than 180 micrometers is also envisioned by the inventor, although not so usual.

Shirasu balloon powder of particle sizes below 25 micrometers has insufficient bulk, and therefore is not capable of performing the essential function (weight reduction) of the shirasu balloon powder 13.

Shirasu balloon powder of particle sizes above 180 micrometers, on the other hand, has less problems but is not preferable for the reason of the classification of the shirasu balloon powder 13.

This is because shirasu balloon powder 13 often includes wooden dust of particle sizes above 180 micrometers which may pass the screen during classification, thereby mixing into the selected shirasu balloon powder 13 and burning during firing, causing pin holes in the products.

While one of the objectives of using shirasu balloon powder is to generate minute pores in the product to reduce the weight thereof, shirasu balloon powder 13 of smaller particle sizes is not capable of generating the pores in the product and also decreases the fire resistance of the product.

Consequently, it was found that the particle size mentioned above is the lower limit.

Wooden dust of particle sizes within 180 micrometers completely burns during firing and therefore does not generate pin holes, and requires no special consideration.

For the above reasons, shirasu balloon powder 13 is first classified to obtain those of particle sizes from 25 to 180 micrometers, although these figures should not be regarded as a strict standard but as a rough guideline.

Now the reason of using shirasu powder 12 of particle sizes from 14 to 90 micrometers before expanding into balloons will be understood from the discussion above.

Shirasu balloon powder 13 of the regulated particle sizes which are selected in the process described above includes impurities such as iron and titanium, although in relatively small quantities.

These impurities cause spots to develop on the product surface through oxidation during the firing process after glazing.

Although this causes no problem in the case of non-white pottery products, it adversely affects the product value of white pottery, and therefore must be prevented.

The reason of allowing impurities to be included in non-white pottery products will be discussed later.

The inventors processed the shirasu balloon powder 13 with a magnet filter 16 (called ferro-filter) to remove impurities 18 therefrom, and consequently obtained selected shirasu balloon powder 20 of high purity with the impurities 18 removed.

Selected shirasu balloon powder as used herein means shirasu balloon powder from which the impurities 18 and balloon particles of sizes out of the tolerance have been removed.

The expression "removing all or significant part of impurities" is used to mean to remove the impurities to such an extent that adverse effects of the impurities on the product value are eliminated.

By removing all or a significant part of impurities 18, selected shirasu balloon powder 20 of a composition different from that of shirasu balloon powder 13, namely shirasu balloon powder with all or significant part of impurities such as iron and titanium removed, is obtained.

A process of obtaining selected shirasu balloon powder 20 by expanding shirasu powder into shirasu balloon powder 13 then removing all or significant part of impurities 18 was described before (Cf. No. 2 and No. 4).

This may be modified so that the impurities are removed from shirasu powder before it is expanded into balloons (Cf. No. 2 and No. 4).

Then it is usually scheduled to make a mixture of the selected shirasu balloon powder 20 and other material such as body 26, by adding water 22 to the body 26 simultaneously (refer to Patent Publication No. S-62-98592).

However, bulk specific gravity of the selected shirasu balloon powder 20 is generally as low as 0.1 to 0.3 g, depending on the particle size.

Thus it was found that the mixing method described above includes a serious problem of inability to uniformly diffuse the selected shirasu balloons 20 in another material such as the body during mixing, leaving the selected shirasu balloons 20 locally concentrated.

Inventors put 10 to 15 weight % of the selected shirasu balloon powder 20 into water 22 contained in a tank 24, then mixed it, and uniformly distributed the selected shirasu balloons 20 in water 22.

Meanwhile, 60 weight % of body 26 consisting of feldspar, touseki, silica rock and gairomenendo and 25 to 30 weight % of a reinforcement agent 28 for the purpose of enhancing the strength in the form of fine powder, 1 to 10 micrometers in particle size, of one or more kinds selected from among alumina, zircon, cristobalite, magnesia and talc, are mixed in a dry process, with the mixture being put into the water 22 where the selected shirasu balloon powder 20 is being mixed.

After mixing the water 22, selected shirasu balloon powder 20, body 26 and reinforcement agent fine powder 28, a uniform mixture was obtained without such problems as the selected shirasu balloons 20 being localized in the upper part of the mixture.

Although the explanation of this embodiment assumes that the mixture of body 26 and reinforcement agent 28 is put into water 22, they may be separately added to the water and mixed in the order of body 26 then reinforcement agent 28.

While it is preferable to first put only the selected shirasu balloon powder 20 into the water 22 and mix them, some of the body 26 may be put into the water together with the selected shirasu balloon powder 20 to mix them simultaneously.

It was also experimentally found that a preferable ratio water, it is subjected to an ordinary dewatering process by means of a dewatering machine 29 to obtain a material to manufacture pottery similar to clay.

It is preferable to mold the pottery material which includes the selected shirasu balloon powder 20 in the form of cakes 30 for the convenience of storage and transportation.

For this purpose, a vacuum kneading machine 32 is used as in the usual cases. It is particularly advantageous to keep the porcelain material in the form of cakes 30, because distribution of the selected shirasu balloons 20 may become uneven during transportation or handling due to unstable ambient conditions.

The process that follows has no significant difference from the ordinary porcelain manufacturing process.

While pottery products are manufactured through molding, drying, glazing and firing processes, firing temperature is preferably from 1000° to 1300° C.

As generally known, the material is molded in a molding machine 34 and dried in a drying furnace 36.

Then the objects are glazed on a glazing machine 38 and fired in a firing kiln 42 to make the products 40.

It goes without saying that a transparent glaze is used to produce white pottery. The selected shirasu balloons 20 in the object melt when fired, leaving numerous tiny pores 44 (Cf. FIG. 2 and FIG. 3).

A selected shirasu balloon 20 which is melted forms a wall surrounding a pore, with a half-molten layer 46 (Cf. FIG. 3) on the outside of the wall making firm bond with the body 26 and the reinforcement agent 28.

Consequently, while half-molten layer 46 remains in the product, the half-molten layer 46 is vitrified to contribute to the strength of the product, because the product firing temperature is higher than that of expansion to form balloons.

While the remainder of the selected shirasu balloon 20 after firing, namely the half-molten layer 46, bonds with the material surrounding the pore 44, a number of such pores exist in the product to reduce the weight thereof by about 20 to 30% compared to conventional porcelain products.

Thus highly white products can be obtained with the pores uniformly distributed throughout the product because of uniform distribution of the selected shirasu balloons 20 in the pottery mixture, resulting in uniform density distribution.

Second embodiment

Constitution of a material to manufacture non-white pottery and the method of manufacturing non-white pottery products will be explained in the following.

It has been pointed out that impurities such as iron must be removed from the shirasu balloon powder to manufacture white pottery because the impurities included in the shirasu balloon powder 13 cause stains on the product surface.

In the case of non-white pottery, however, the inventors experimentally proved that the impurities such as iron included in the shirasu balloon powder need not be removed or reduced. of water to the mixture of selected shirasu balloon powder 20, body 26 and reinforcement agent 28 is approximately 1:1.

As to the method of mixing the selected shirasu balloon powder 20, body 26 and reinforcement agent 28 uniformly, the inventors envision the following method in addition to that set forth above.

20 to 30 weight % of water is added to the selected shirasu balloon powder 20, body 26 and reinforcement agent 28 such as alumina, zircon, cristobalite, magnesia and talc, mixing them in a dry process and kneading them to have the selected shirasu balloons uniformly diffused.

A relatively small quantity of water and a hydrophilic lubricant such as glycerin (about 1 to 5%) are added to the selected shirasu balloon powder 20, body 26 and reinforcement agent 28 such as alumina, zircon, cristobalite, magnesia and talc, and kneading the mixture to have the selected shirasu balloon uniformly diffused.

The term reinforcement agent as used herein means a fine powder such as alumina, zircon, cristobalite, magnesia and talc, which crystallize when fired after glazing.

The reinforcement agent 28 has an advantage that the crystallization thereof causes strong bonding between a grain of the reinforcement agent 28 and the surrounding body 26.

Because the mixture of the selected shirasu balloon powder 20, body 26 and reinforcement agent 28 includes much As is well known, opaque glaze is used to produce non-white pottery products, and the opaque glaze conceals all the impurities 18, even if they appear on the surface of the pottery product.

For the above reason, this embodiment uses the shirasu balloon powder 13 which includes the impurities 18, and therefore omits the process of removing the impurities 18.

A particular procedure may be as follows.

(1) Shirasu rock is ground to obtain shirasu powder.

(2) Shirasu powder is sieved to regulate the particle size.

(3) Shirasu powder of regulated particle size is heated to expand to obtain shirasu balloon powder.

(4) The shirasu balloon powder is processed to remove particles which are out of the tolerance, and thereby obtain selected shirasu balloon powder.

(5) Selected shirasu balloon powder is mixed with water.

(6) The mixture of selected shirasu balloon powder and water is mixed with the body and reinforcement agent.

(7) The mixture obtained in step (6) is stirred and kneaded uniformly, then dewatered to obtain a material for the manufacture of non-white pottery.

(8) The material is subjected to processes of molding, drying, glazing and firing to obtain pottery products.

The above procedure is substantially the same as that of manufacturing white pottery, except for the process of removing the impurities 18 being omitted.

Although this embodiment assumes that the material for the manufacture of non-white pottery includes impurities 18 being not removed, they may be removed as desired.

The invention, as set forth above, has the following advantages.

Highly white pottery product without stains can be obtained because all or significant part of impurities such as iron are removed from the shirasu balloon powder used in the manufacture of white pottery products.

Uniform distribution of shirasu balloons or selected shirasu balloons in the mixture of reinforcement agent and body enables it to obtain products with uniform density.

A shirasu balloon or a selected shirasu balloon, which is melted, forms a wall surrounding a pore, with a half-molten layer on the outside of the wall making a firm bond with the body through crystallization.

Consequently, use of shirasu balloon make it possible to reduce the product weight without compromising the product strength.

What is claimed is:

1. A method for preparing a white pottery product containing shirasu balloon powder comprising:

sieving shirasu balloon powder to obtain a fine powder of shirasu balloons;

removing darkening impurities from the fine powder by means of a magnetic filter in order to obtain selected shirasu balloon powder, said darkening impurities including iron and titanium;

uniformly mixing the selected shirasu balloon powder in water to form a first mixture;

mixing a pottery material which constitutes the body of the white pottery product with at least one reinforcement material selected from the group consisting of alumina, zircon, cristoballite, magnesium oxide and magnesium silicate, to form a second mixture;

adding the second mixture to the first mixture and thoroughly mixing to form a third mixture;

dewatering the third mixture to obtain a pre-fired product in which the selected shirasu balloon powder is uniformly dispersed;

molding the pre-fired product into a desired shape, and drying it; and glazing the thus-molded pre-fired product with a transparent glaze, and firing it to form the white pottery product.

2. A method for preparing a non-white pottery product containing shirasu balloon powder comprising:

uniformly mixing the shirasu balloon powder in water to form a first mixture;

mixing a pottery material which constitutes the body of the non-white pottery product with at least one reinforcement material selected from the group consisting of alumina, zircon, cristoballite, magnesium oxide and magnesium silicate, to form a second mixture;

adding the second mixture to the first mixture and thoroughly mixing to form a third mixture;

dewatering the third mixture to obtain a pre-fired product in which the shirasu balloon powder is uniformly dispersed;

molding the pre-fired product into a desired shape, and drying it; and glazing the thus-molded pre-fired product with a non-transparent glaze, and firing it to form the non-white pottery product.

* * * * *